Hopper & Garrison,
Anti-Friction Roller.
Nº 5,996.   Patented Jan. 2, 1849.

UNITED STATES PATENT OFFICE.

THOS. HOPPER AND THOS. GARRISON, OF NEW BRUNSWICK, NEW JERSEY.

JOURNAL AND BOX.

Specification of Letters Patent No. 5,996, dated January 2, 1849.

*To all whom it may concern:*

Be it known that we, THOMAS HOPPER and THOMAS GARRISON, of New Brunswick, in the county of Middlesex and State of New Jersey, have invented a new and useful apparatus which he denominate "Antifriction-Box," and that the following is a full, clear, and exact description of the principle or character which distinguishes it from all other things before known and of the usual manner of making, modifying, and using the same, reference being had to the accompanying drawing, which forms a part thereof, in which—

Figure 2:
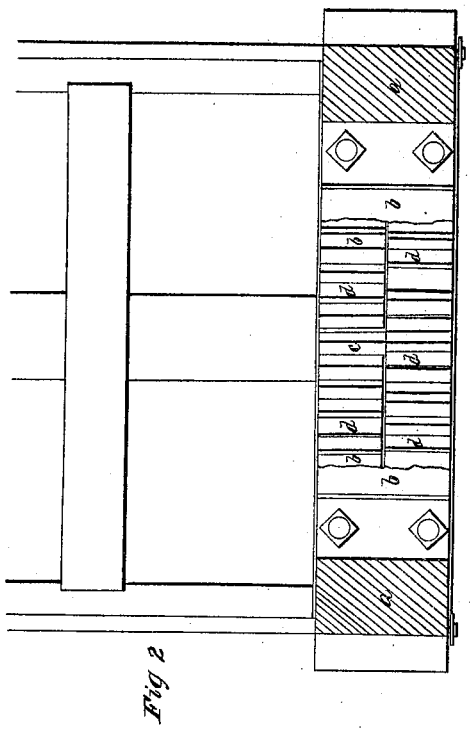
Figure 1:
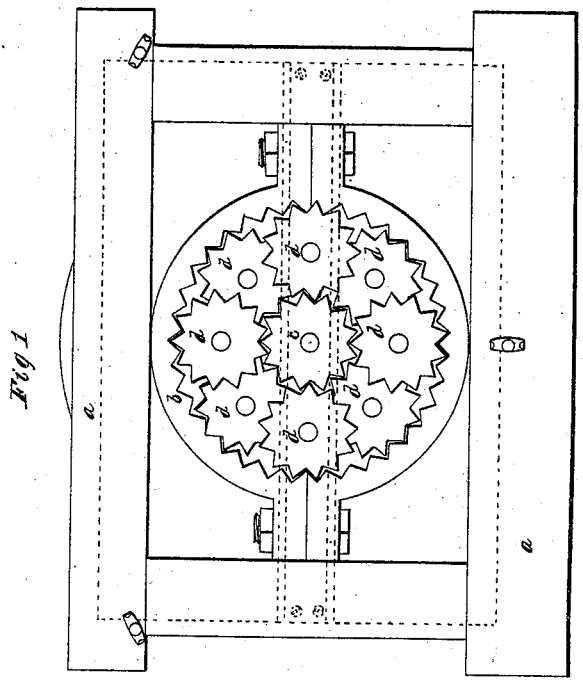

Figure 1 is an end elevation. Fig. 2 is a top plan with a portion of the outer cylinder removed to show the arrangement of the blocks or rollers.

The nature of our improvement consists in arranging around a journal, suitable for the purpose intended, a series of wheels, which we denominate blocks, that traverse around a stationary including cylinder, which is connected with the frame in any of the usual ways. The exterior surface of the journals and blocks, and also the interior surface of the cylindrical casing being grooved, so as to form what are generally called miter teeth, the two faces of which are at right angles, or nearly so, to each other.

The construction is as follows, reference being made to the drawing as above stated: (*a*, *a*) is a portion of the frame; (*b*) is a short hollow cylinder, open at both ends, which may be constructed in two parts, and bolted together, as shown in the drawing; or it may be made in one, or any number of pieces; it is grooved on its inner surface from end to end, with miter grooves, as above stated. Concentric with this, and at its center the journal (*c*) is placed; this journal may either be made with the grooves cut into it, or a thimble may be fitted onto it, in which said grooves are cut; around the journal, and between it and the exterior cylinder, we place two series of rollers *d*, each series being made of a length equal to one-half of the length of the cylinder. We propose sometimes to vary the number of series and may use a greater number of series than two, in which case they are made proportionally shorter, so that all the series combined will be equal to the length of the including cylinder. The number of rollers in each series may vary according to circumstances, and the purpose to which they are to be applied. In the drawing there are four in each series, and the two series are made to break joint with each other, as is clearly represented in Fig. 2; thus always having a block in position to resist the downward pressure without too much binding strain on the preceding blocks; by this arrangement all the parts are made to run without the friction of rubbing surfaces, and may run without oil or other lubricator, as has been experimentally demonstrated at high velocities. Each one of these rollers being independent, and no oil or other lubricator being necessary, the whole front can be made to open, as shown in the red lines. Fig. 1, and any one of the rollers removed, if found defective, and replaced by a perfect one, which cannot be done with those boxes when the series are attached together or cogged.

Some attempts have heretofore been made to relieve the friction by plain rollers, which break joint in a similar manner to ours, but they soon get to crowd upon each other and bind which at once creates friction and heats the parts, thus rendering it impossible to run without a lubricator, or if the whole series are connected by a ring and there is any difference in their size caused by wear or otherwise a friction of rubbing parts is at once created. Another plan has been to combine cogs with smooth rollers in one piece, but it will at once be seen that in practice it cannot be effected without causing the surfaces to rub, for the number of revolutions the rollers turn on their own axes in going once around the journal is governed and limited, while the smooth surface must vary by wear; all these devices therefore are subject to become heated in consequence of their surfaces rubbing.

By our improved construction we possess the advantage of a rolling surface and at the same time by the shape of the tooth present a great bearing surface not liable to be crushed and one which it is impossible to make bind as would be the case if the ordinary cog were employed.

Having thus fully described our improved antifriction journals and their mode of operation what we claim therein as new, and for which we desire to secure Letters Patent is—

Supporting the box or journal upon the series of miter grooved rollers or blocks, working into similar grooves on the journal and bearing said rollers being without journals, and the whole being constructed and arranged substantially in the manner and for the purposes set forth.

THOMAS HOPPER.
THOMAS GARRISON.

Witnesses:
J. J. GREENOUGH,
WM. GREENOUGH.